United States Patent
Ten-Jet-Foei et al.

(10) Patent No.: US 12,084,905 B2
(45) Date of Patent: Sep. 10, 2024

(54) CENTRAL POP-UP GEARBOX ON STANDARD PLATFORM MOTOR

(71) Applicant: Inalfa Roof Systems Group B.V., Oostrum (NL)

(72) Inventors: Suyanto Teri Wahiyu Ten-Jet-Foei, Helmond (NL); Bjorn Arnoldus Franciscus Welmer, Deurne (NL); Marcel Johan Christiaan Nellen, Merselo (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 344 days.

(21) Appl. No.: 17/645,676

(22) Filed: Dec. 22, 2021

(65) Prior Publication Data

US 2022/0205304 A1    Jun. 30, 2022

(30) Foreign Application Priority Data

Dec. 24, 2020    (EP) .................................... 20217306
Nov. 9, 2021    (EP) .................................... 21207311

(51) Int. Cl.
*B60J 7/057*    (2006.01)
*B60J 7/043*    (2006.01)
(Continued)

(52) U.S. Cl.
CPC ............ *E05F 15/649* (2015.01); *B60J 7/043* (2013.01); *B60J 7/0573* (2013.01);
(Continued)

(58) Field of Classification Search
CPC . B60J 7/043; B60J 7/057; B60J 7/0573; B60J 7/1642; F16H 57/02; F16H 57/028
(Continued)

(56) References Cited

U.S. PATENT DOCUMENTS 3,874,722 A    4/1975 Pickles
4,390,203 A    6/1983 Lutz et al.
(Continued)

FOREIGN PATENT DOCUMENTS

DE    3114502 A1    2/1982
DE    4014487 C1    8/1991
(Continued)

OTHER PUBLICATIONS

European Search Report in corresponding European Patent Application No. 20217306.8 dated May 20, 2021.

*Primary Examiner* — Dennis H Pedder
(74) *Attorney, Agent, or Firm* — Steven M. Koehler; Westman, Champlin & Koehler, P.A.

(57) ABSTRACT

An open roof construction for a vehicle comprises a panel for opening and closing an opening in the fixed roof of the vehicle by means of at least one lever assembly connected to the panel. A stationary frame is fitted in the opening of the fixed roof. A drive motor is placed in the vicinity of the rear edge of the opening and in the vicinity of a longitudinal center line of the opening. The drive motor comprises an output shaft having a center axis which is perpendicular to a center axis of a rotor shaft of the drive motor. The drive motor is connected to a motor support which is attached to the frame by means of vibration dampers. The motor support supports a separate gearbox which is capable of transferring the driving torque from the drive motor to the at least one lever assembly connected to the panel.

20 Claims, 9 Drawing Sheets

(51) Int. Cl.
*E05F 15/649* (2015.01)
*E05F 15/662* (2015.01)
*F16H 57/028* (2012.01)

(52) U.S. Cl.
CPC ......... *E05F 15/662* (2015.01); *F16H 57/028* (2013.01); *E05Y 2201/626* (2013.01); *E05Y 2201/628* (2013.01); *E05Y 2201/704* (2013.01); *E05Y 2201/71* (2013.01); *E05Y 2600/51* (2013.01); *E05Y 2800/422* (2013.01); *E05Y 2900/542* (2013.01)

(58) Field of Classification Search
USPC ............................................ 296/223, 216.02
See application file for complete search history.

(56) References Cited

U.S. PATENT DOCUMENTS

| | | | |
|---|---|---|---|
| 4,468,063 A | 8/1984 | Yukimoto et al. | |
| 4,659,140 A | 4/1987 | Fuerst et al. | |
| 4,929,019 A * | 5/1990 | Paakkonen | B60J 7/1642 |
| | | | 296/216.02 |
| 5,020,850 A | 6/1991 | Bienert et al. | |
| 5,104,178 A | 4/1992 | Bienert | |
| 5,212,999 A * | 5/1993 | Kitada | F16H 57/021 |
| | | | 74/425 |
| 5,768,942 A * | 6/1998 | Gruber | B60J 7/0573 |
| | | | 74/606 R |
| 7,891,730 B2 * | 2/2011 | Rikkert | F16H 37/065 |
| | | | 296/220.01 |
| 8,348,240 B2 | 1/2013 | Butsuen et al. | |
| 10,322,623 B2 | 6/2019 | Land et al. | |
| 2004/0119433 A1 | 6/2004 | Tanoi et al. | |
| 2009/0224574 A1 | 9/2009 | Rikkert | |
| 2011/0147113 A1 * | 6/2011 | Ko | F16H 57/039 |
| | | | 180/444 |
| 2016/0288631 A1 | 10/2016 | Parkila et al. | |
| 2018/0147921 A1 | 5/2018 | Land et al. | |

FOREIGN PATENT DOCUMENTS

| | | |
|---|---|---|
| DE | 4012635 A1 | 10/1991 |
| DE | 4318481 A1 | 12/1994 |
| DE | 4323946 C1 | 12/1994 |
| DE | 19952168 A1 | 5/2001 |
| DE | 10349116 A1 | 5/2004 |
| EP | 0795699 A1 | 9/1997 |
| EP | 1588882 A1 | 10/2005 |
| EP | 2098396 A1 | 9/2009 |
| EP | 3326851 A1 | 5/2018 |
| JP | 11240333 A | 9/1999 |
| JP | 5185693 B2 | 4/2013 |

* cited by examiner

CENTRAL POP-UP GEARBOX ON STANDARD PLATFORM MOTOR

BACKGROUND

The discussion below is merely provided for general background information and is not intended to be used as an aid in determining the scope of the claimed subject matter.

Aspects of the invention relate to an open roof construction for a vehicle having an opening in its fixed roof. It comprises at least a panel capable of at least partly opening and closing the opening in the fixed roof of the vehicle by means of an operating mechanism such as at least one lever assembly connected to the panel. A stationary frame is fitted in the opening of the fixed roof. A drive motor may be placed in the vicinity of the rear edge of the opening in the fixed roof and in the vicinity of a longitudinal center line of the opening. The drive motor comprises an output shaft having a center axis which is perpendicular to a center axis of a rotor shaft of the drive motor. The drive motor is connected to a motor support which is attached to the frame by means of vibration dampers.

Such open roof constructions are known in the art, however usually from products not having an Anti-Trap System (ATS) that complies with the state of the art required for the legal requirements in the EU and North America (NA). To comply with the todays legal ATS requirements, the software and electronics are developed and tuned to the hardware of the open roof construction. Major influencing parts for tuning the software and electronics are the mechanisms that move the panel and the driveline including the motor. Developing software and electronics from scratch for an open roof construction is a timely and expensive project. Such software (loaded in a CPU) and further electronics usually are physically incorporated in an electronic box attached to the motor. Further in the automotive industry there is a continuous strive for reduction of noise and vibrations, which makes the Noise Vibrations and Harshness (NVH) requirements of the vehicle more and more challenging as before.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In the present open roof construction, the motor support supports a separate gearbox which is configured to transfer the driving torque from the drive motor to the at least one lever assembly connected to the panel. The motor with the ATS software and electronics, which are developed and industrialized for another type of open roof construction, may be used due to the use of a separate (or additional) gearbox. The software and electronics stored in the electronic box attached to this known motor is useable to a large extent for the new type of open roof construction of the present invention. This means that the software and electronics for a small part need to be adjusted towards the new mechanism and driveline of the new open roof construction of the present invention. In this way, using such known motor, costs and timing in the development project may be reduced while meeting the legal ATS requirements.

According to another aspect of the invention the gearbox comprises a rotation rod extending in a transverse direction of the open roof construction and a set of gear wheels to transfer the torque from the output shaft of the motor through 90 degrees to the rotation rod and this set of gearwheels comprises a first worm wheel connected to an input shaft of the gearbox and a gear wheel attached to the rotation rod.

Part of the mechanism is built in a so-called "add on" gearbox, which is a separate part from the motor with internal gearbox. This "add-on" gearbox is partly required because of the input axis of the known motor being perpendicular to the axis of the rotor of the motor and thus perpendicular to the main rotation rod of the mechanism. To solve this, a set of gearwheels is mounted in the gearbox to create a geared engagement between the output axis of the motor and the main rotation rod of the mechanism.

As such, the gearbox can be developed and tuned such that a minimum of tuning of the ATS software and electronics is required, and at the same time the motor and the separate gearbox can be isolated from the frame by means of vibration dampers. To have a maximum effect of these dampers the motor is fixedly connected to the motor support being part of the gearbox, and the motor support is isolated from the frame by vibration dampers thereby isolating the motor and the gearbox from the frame.

According to another aspect of the invention, a bearing comprising vibration-damping material is mounted on an input shaft of the gearbox. Moreover, the gear wheels are equipped with a bearing comprising vibration-damping material.

It is advantageous that as much as possible, the vibrations coming from the motor are isolated and/or damped before the vibrations may be transmitted to the panel. This is because the panel my act as a speaker and may dissipate vibrations towards the interior of the vehicle. To reduce any transmission of vibrations to the panel a series of isolation measurements are proposed. One of these measurements is the vibration-damping element mounted on an input shaft, i.e., the bearing containing vibration damping material.

According to another aspect of the invention the drive motor is connected to the motor support by means of screws. To avoid any transmission of vibrations via the motor support to the frame, the gearbox is connected to the frame by vibration dampers.

According to another aspect of the invention the lever assemblies are each attached to an end of the rotation rod. The rotation rod extends in transverse direction of the open roof construction such that the lever assemblies mounted at the extreme ends of the rod are positioned near short sides of the motor and within the boundaries of the inner side of a headliner, when the panel is in a closed position. As such, the levers are hidden behind the headliners even if the panel is in an open position; it is not likely that occupants from their seating position can observe the levers.

According to another aspect of the invention, the rotation rod is isolated from the gearbox housing by at least one bearing equipped with vibration damping material. Should there be any transmission of vibrations via the output gearwheel to the gearbox; a second line of vibration isolation is created by the bearings of the rotation rod in order to reduce vibrations and noises to be transmitted to the interior of the vehicle.

According to another aspect of the invention, the lever assembly at a hinge point is equipped with a bearing comprising vibration-damping material. Likewise, to reduce or isolate any transmission of vibrations that, despite the measures comprising damping material described before, may be subjected to the lever assembly, a hinge point of the levers may be equipped with a bearing comprising damping material. This may be applied at any of the hinge points of the at least one lever assembly.

According to another embodiment of the invention, the rotation rod extends in transverse direction of the open roof construction such that the lever assemblies mounted at the extreme ends of the rod are positioned in the vicinity of lateral sides of the panel. This may be the case if, for instance when the panel is closed, the rear corners of the panel may not close off properly against the seals provided for on the frame. This may be the case when the bending stiffness of the panel is not enough, or the sealing is too stiff to close off the panel against the sealing. So, in this case this may be solved by extending the rotation rod in lateral direction and apply lever assemblies at the end of the rod in the area where the levers may be fitted in the vicinity of the rear corners of the panel. Both embodiments may be combined so that there are four lever assemblies distributed along the rear edge of the panel.

Further details and advantages of the invention follow from the below description with reference to the drawings.

DETAILED DESCRIPTION

Figure 1:
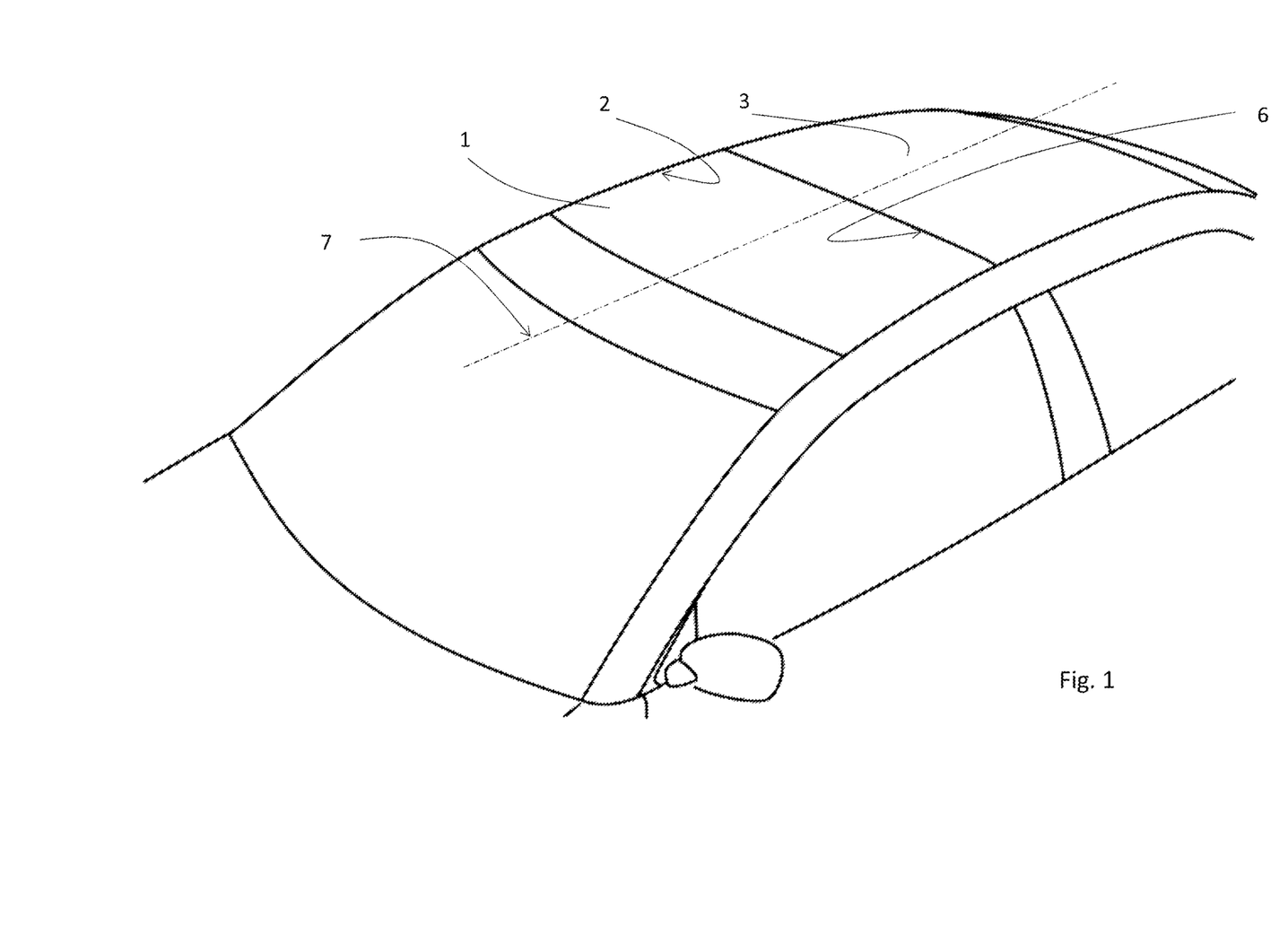
FIG. 1 is a schematic perspective view of a vehicle roof having an open roof construction.

Referring to FIG. 1 a vehicle roof is shown having an open roof construction, in which a roof opening 2 in the vehicle roof can be opened and closed by a panel 1. This panel 1 is part of the open roof construction of the vehicle. The panel 1 in this case is a rigid, at least partly transparent panel, made of glass, plastics or the like. The open roof construction is of the so-called "pop up" type, which means that the operating mechanism of the open roof construction is capable of moving the panel 1 at its rear end upwardly to open the panel 1 and downwardly again to close the panel 1. The panel 1 in this embodiment comprises hinges on its front side, so that the panel 1 can only rotate and not move in longitudinal direction of the open roof construction and vehicle. Some longitudinal movement at the front of the panel would be conceivable, but in a controlled manner in which the longitudinal movement is dependable on the rotational movement.

Figure 2:
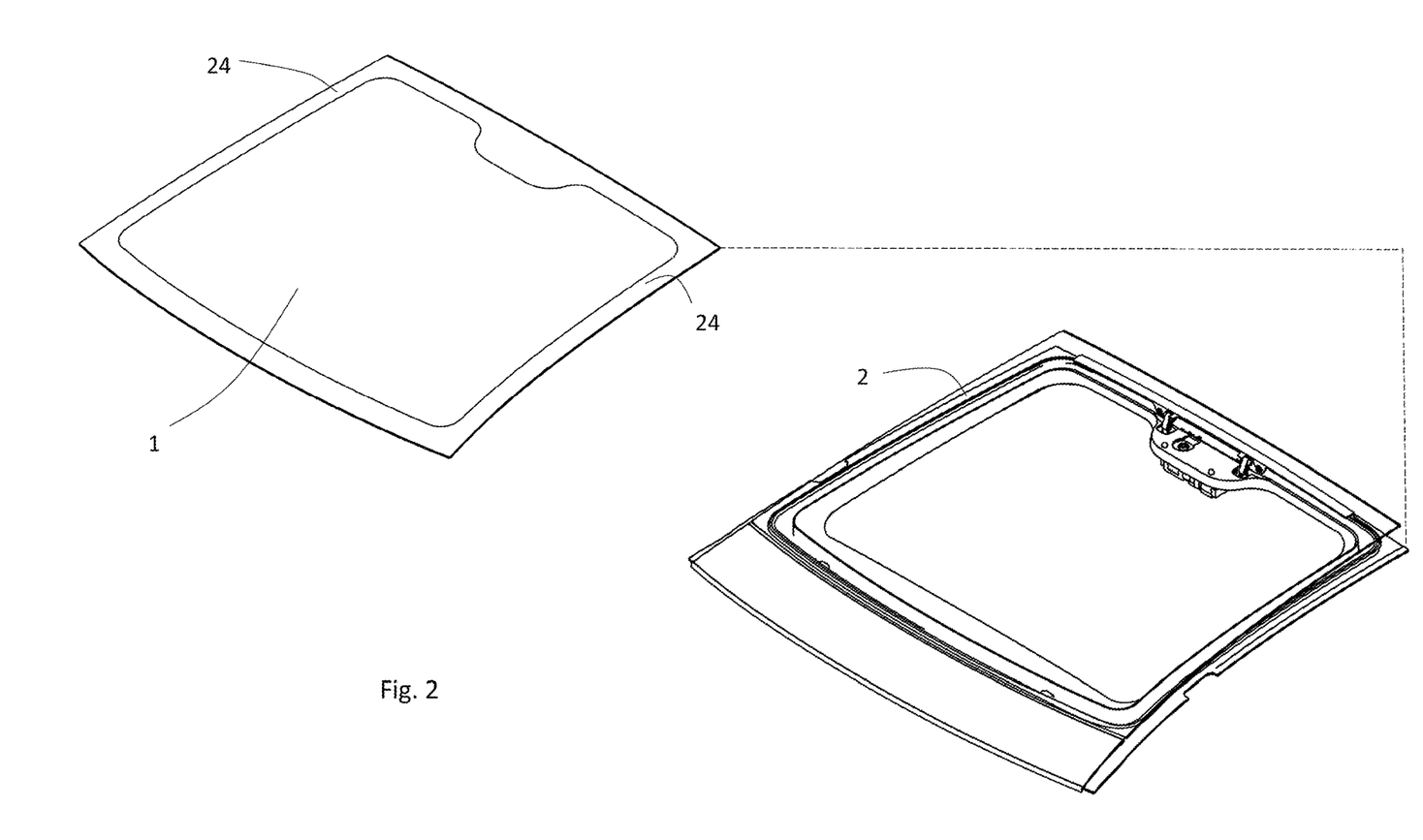
FIG. 2 is an exploded view of the panel and the frame with the operating mechanism of the panel assembled.

The openable panel 1 may be a top loaded open roof construction or a bottom loaded roof construction, meaning that the open roof construction when assembled in the vehicle may be assembled from the upper (top) side of the roof of the vehicle or the from the lower (bottom) side of the roof. The drawings in this document show a top loaded open roof construction. In FIG. 2, the panel 1 is shown separately from a frame 4 of the open roof construction. A small part of the frame 4 is shown e.g., in FIGS. 6-8. On the frame 4 are attached a drive motor 5, a gearbox 12 and two lever assemblies 13, 13' which parts are clearly shown in FIG. 3. These parts form the operating mechanism for the panel. The drive motor 5 is placed in a vicinity of the rear edge 6 of the opening 2 in the fixed roof 3 and in a vicinity of a longitudinal center line 7 of the opening, see FIG. 1.

Figure 3:
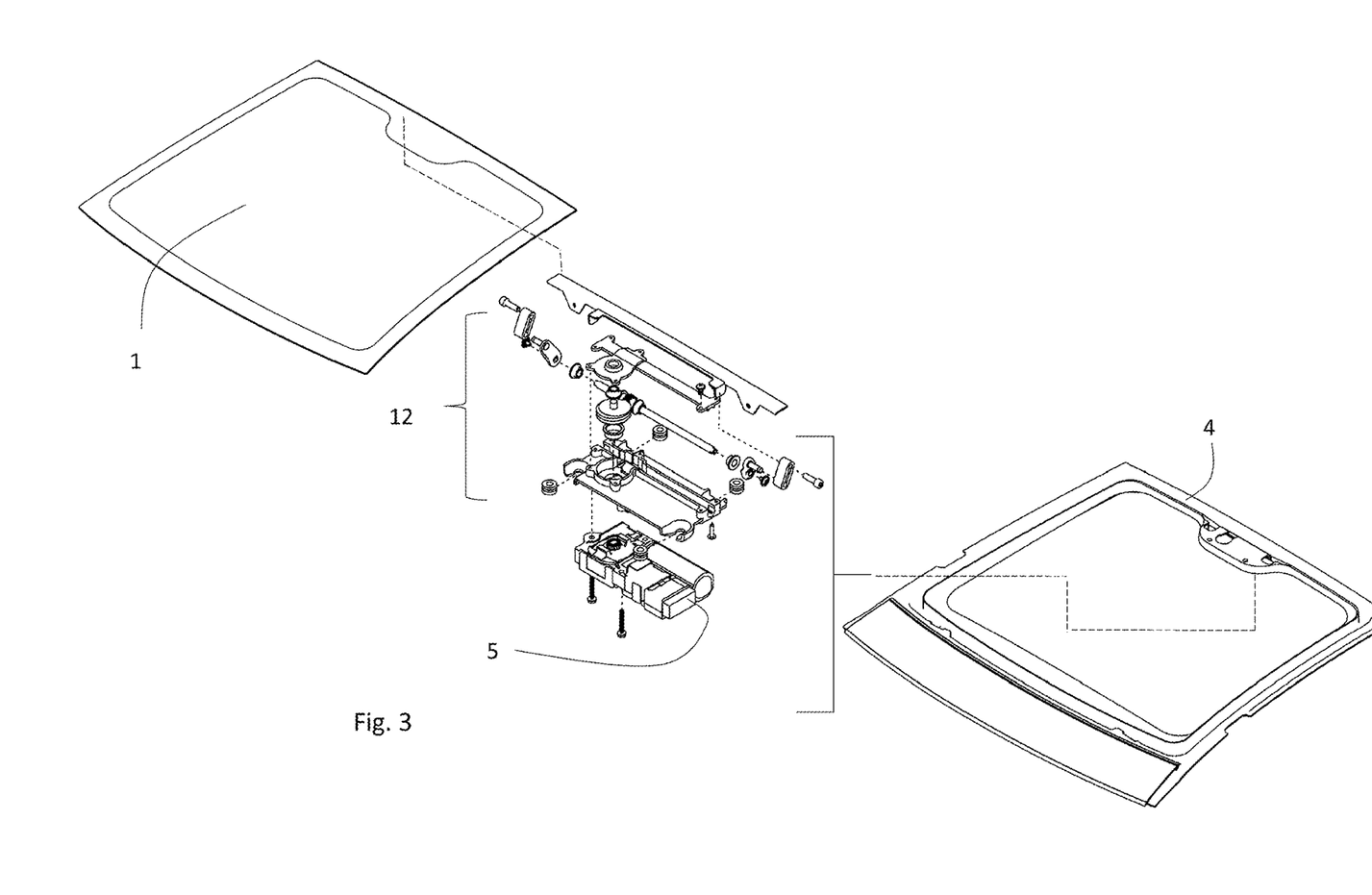
FIG. 3 is an exploded view similar to that of FIG. 2 but showing the operating mechanism in exploded view as well.
Figure 4:
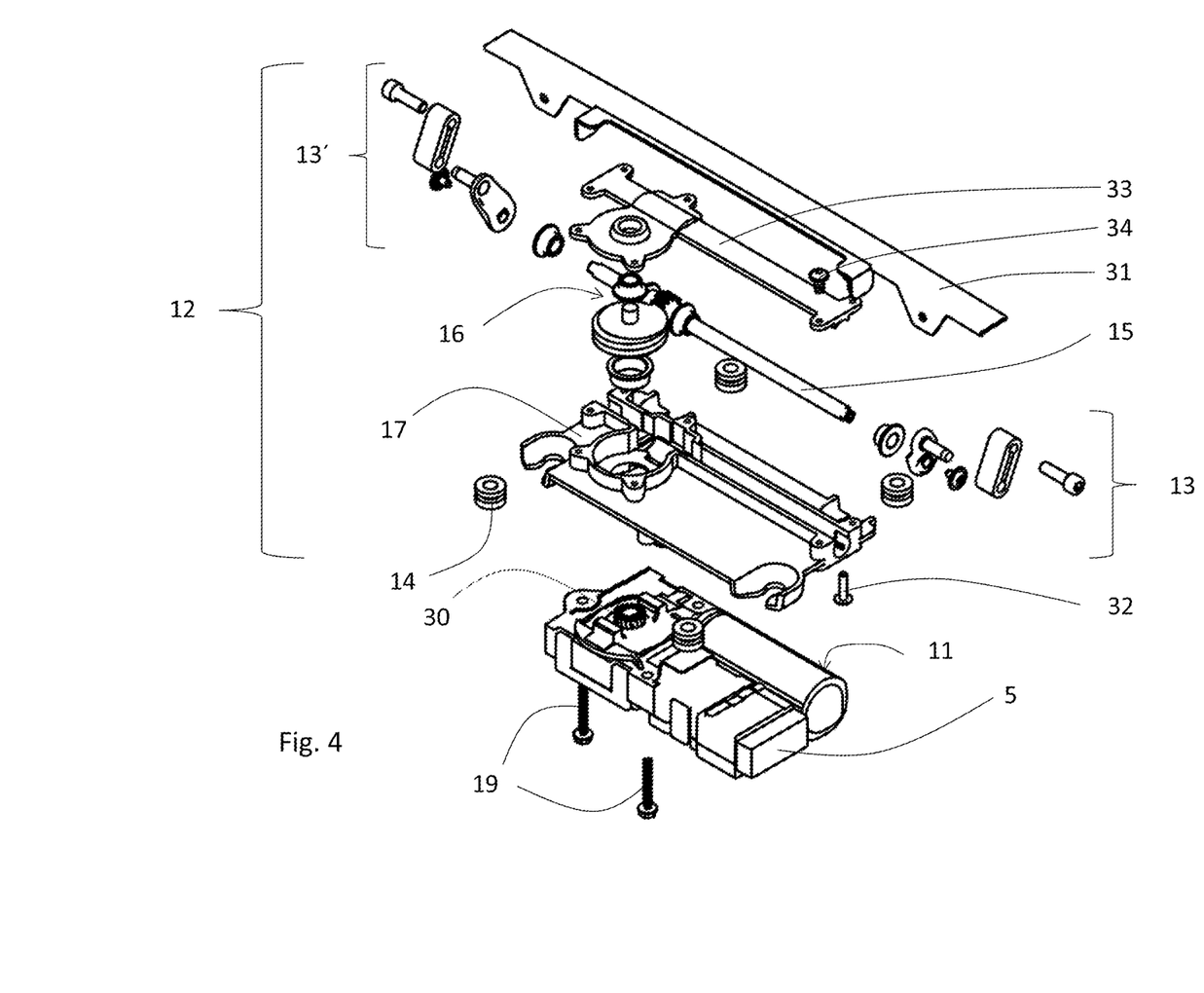
FIG. 4 shows the exploded operating mechanism of FIG. 3 on a larger scale.

As is shown in FIGS. 3 and 4, the motor 5 is mounted to the lower side of a motor support 17 by means of screws 19 inserted from below. This motor support 17 is part of the additional ("add-on") gearbox 12, which is separate from an internal gearbox of the motor 5.

The motor 5 has a gearwheel 30 on an output shaft 8 (FIG. 9) which gearwheel 30 is normally used for engaging drive cables of an operating mechanism. In this open roof construction, the gearwheel 30 of the output shaft 8 fits into a receiving shaft (i.e., the input shaft 29 and a worm wheel 26 carried thereby) of the gearbox 12 (see FIG. 9). The output shaft 8 of the motor 5 is oriented in vertical direction and a drive shaft (i.e., a rotation rod 15) for the lever assemblies 13, 13' is oriented in a horizontal direction transverse to the open roof construction. The worm wheel 26 on the input shaft 29 and a gearwheel 27 on the rotation rod 15 (together forming a set of gearwheels 16) cause the torque of the motor 5 to be transferred from the vertical output shaft 8 to the horizontally oriented rotation rod 15 for the lever assemblies 13, 13'. The lever assemblies 13, 13' are attached in a rotationally fixed manner at the extreme ends 18, 18' of the rotation rod 15.

Figure 10:
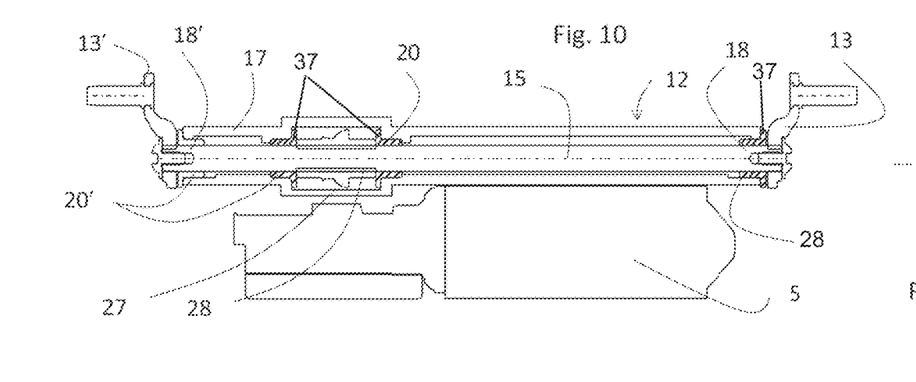
FIG. 10 is a schematic sectional view along line X-X in FIG. 5 showing the rotation rod.
Figure 11:
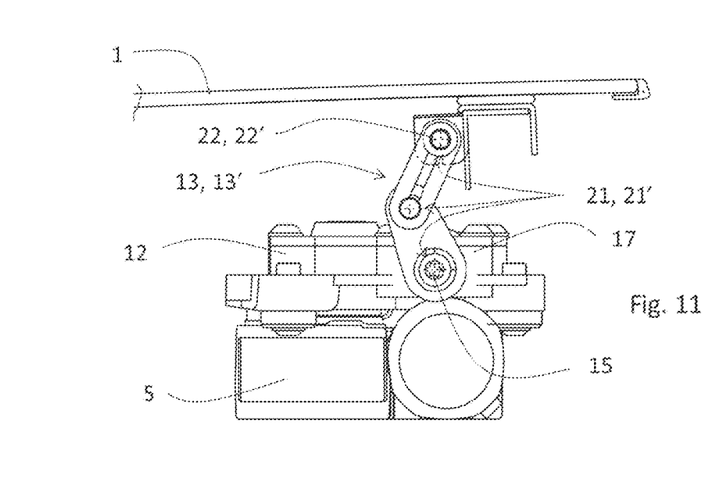
FIG. 11 is a schematic side view of the lever assembly showing the bearing in the hinges of one of the lever assemblies.

FIGS. 10, 11 show that each lever assembly 13, 13' comprises a first lever and a second lever. At each extreme end of the first and second lever of the assemblies 13, 13', a hinge 21, 21' is arranged whereby between the first and second lever only one hinge 21, 21' is present. The lever assemblies 13, 13' are connected at one end to the inside of the panel 1 by means of the respective hinge 21, 21'. For this connection, a panel bracket 31 is glued to the inside of the panel 1. This panel bracket has connection points for the hinges 21, 21' of the lever assemblies 13, 13', such that forces, transferred via the lever assemblies 13, 13', can be exerted to the panel 1. As the longitudinal movement of the panel 1 at the hinges 21, 21' is dependable on the rotation of panel 1, the rotation of the first lever of the lever assemblies 13, 13' is controlled by the rotation rod 15 and the rotation of the second lever is controlled by the rotation of the first lever and the rotation of the panel 1.

Figure 8:
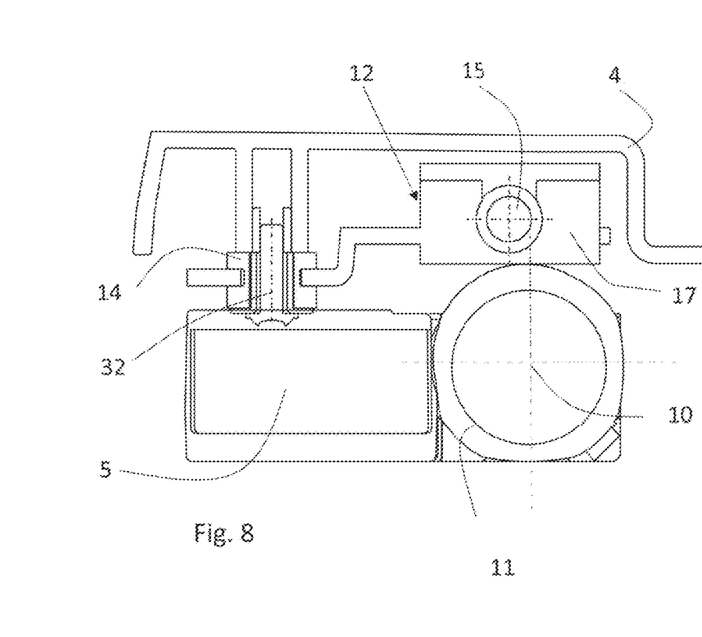
FIG. 8 is a schematic cross section according to line VIII-VIII in FIG. 5 showing the connection between the motor support of the gearbox and the frame.

Referring to FIGS. 4, 5, and 8-10, the gearbox 12 is shown in further detail. The gearbox 12 comprises a gearbox housing which is partly formed by the motor support 17, which is such that vibration dampers 14 may be mounted to it. The vibration dampers 14 may be mounted to the motor support 17 by sliding them into a cavity formed in the motor support 17. Screws 32 (only one is shown in FIGS. 4 and 8) are used to attach an inner bush of the vibration dampers 14 to the frame 4. The motor support 17 is only in contact with (the circumference of) a rubber part of the vibration damper 14 so that the motor support 17 and the motor 5 mounted to it are isolated from the frame 4.

The motor support 17 forms a bottom wall of the gearbox 12 and rotatably accommodates the worm wheel 26, the gearwheel 27 and the rotation rod 15 by means of bearings 25 (for worm wheel 26, FIG. 9) 20, 20' (for gearwheel 27, FIG. 10), 28 (for rotation rod 15, FIG. 10) that comprise vibration-damping materials 37. Further, the motor support 17 at its upper side comprises a cover 33 to form a gearbox housing. The cover 33 is fixed by means of screws 34 to the motor support 17.

Figure 5:
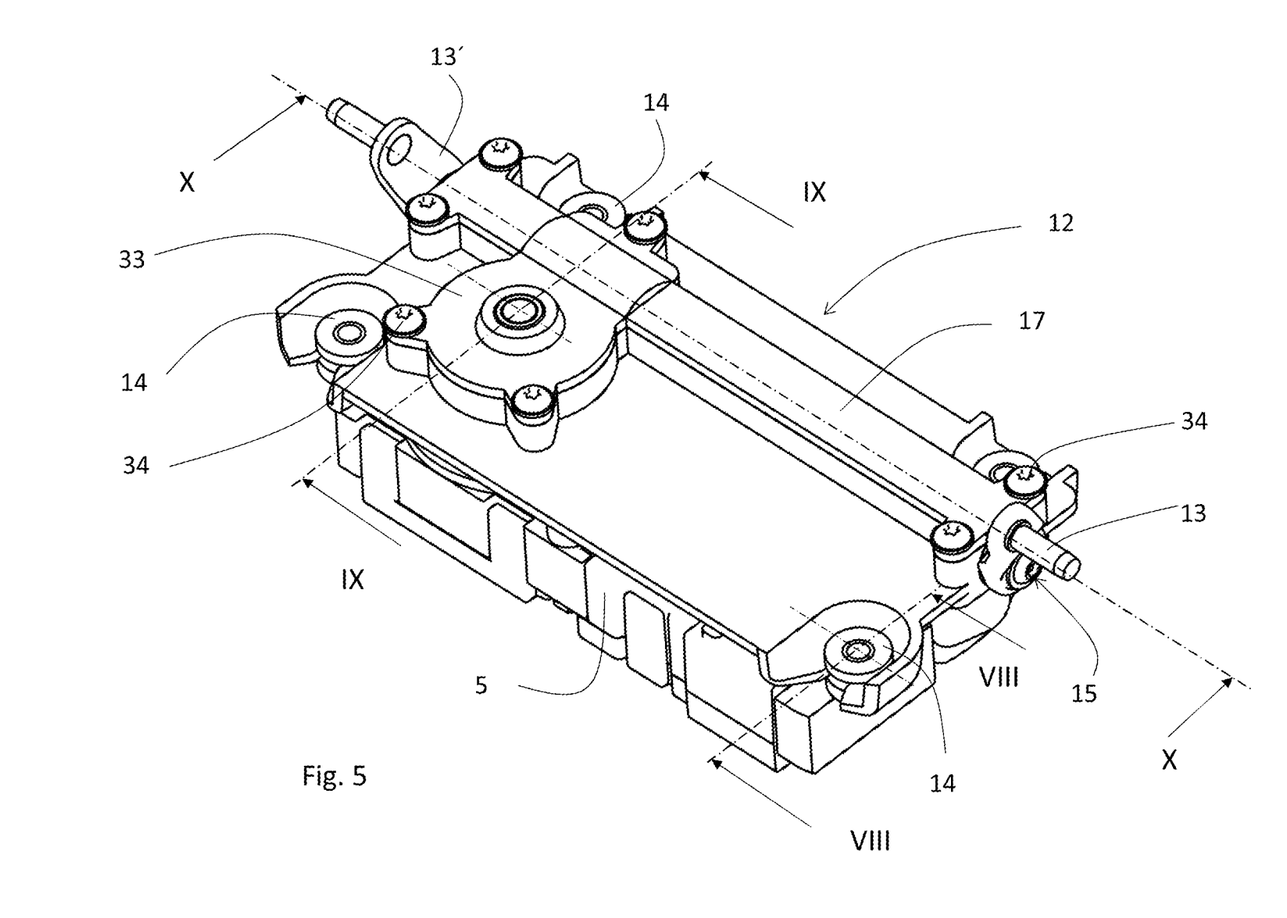
FIG. 5 is a perspective view of the motor and the operating mechanism.

In FIG. 5, the gearbox 12 is shown in an assembled condition with underneath the motor support 17 the motor 5 attached to it.

Figure 6:
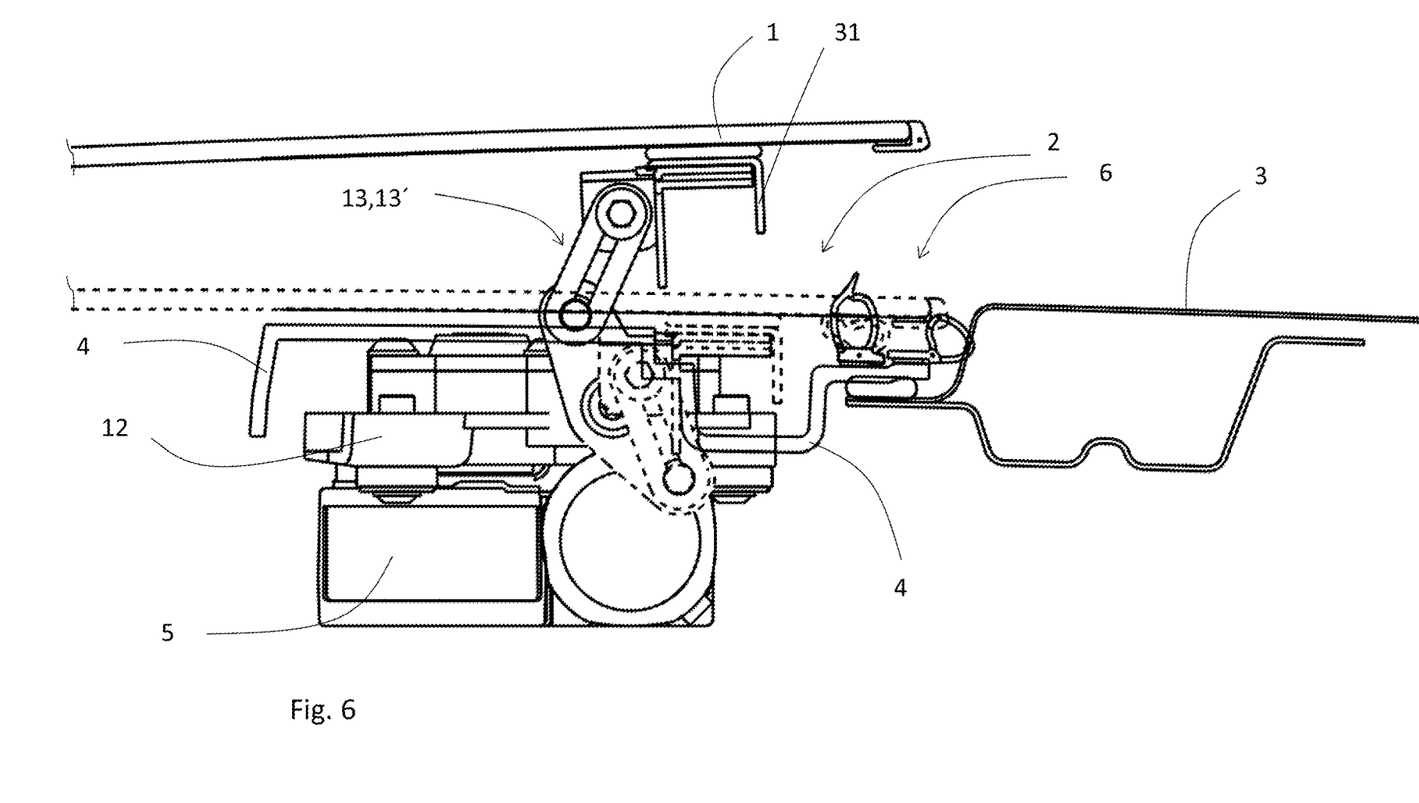
FIG. 6 is a schematic side view of the motor, the operating mechanism, part of the panel and the frame and part of the fixed roof.

In FIG. 6 a side view is shown whereby the panel 1 is shown in an open position (solid lines) and in closed position (dotted lines). The fixed roof 3 is shown partly and as such only a section of the rear edge of the opening 6 is visible. The frame 4 is mounted on a flange of the fixed roof 3 by means of glue, however also fixing methods using screws or the like are conceivable. The frame 4 is made of plastic, however it is also conceivable that the frame 4 is made of steel or another metal. On the upper side of the flange of the frame 4 a seal is mounted, with which the panel 1 is in contact when the panel 1 is closed and which seal provides a water and noise tight closure between the frame 4 and the closed panel 1. The motor 5 is shown below the gearbox 12. The lever assemblies 13, 13' are shown in a position when the panel 1 is in an open position (solid lines), and in a position in which the panel 1 is in a closed position (dotted lines).

Figure 7:
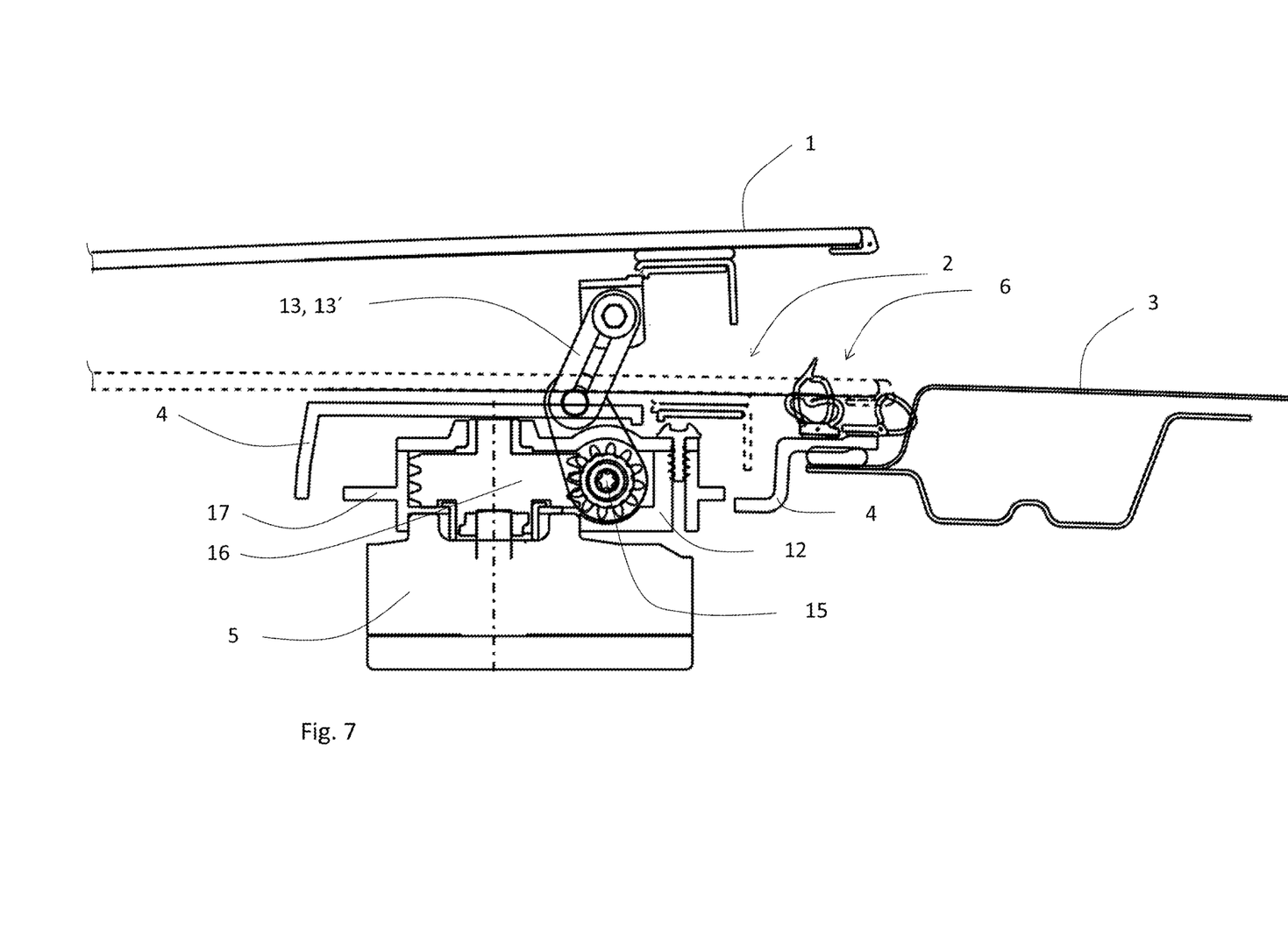
FIG. 7 is a schematic side view similar to that of FIG. 6, but showing the gearbox in a sectional view.

In FIG. 7, in a similar view as in FIG. 6, the gearbox 12 is shown with a section through the set of gearwheels 16 (which includes worm wheel 26 and gearwheel 27), the output shaft 8 of the motor 5 and the rotation rod 15. In this view is shown how the torque from the motor 5 is transferred from the output shaft 8 (FIG. 9) of the motor 5 via the worm wheel 26 to the gearwheel 27 (FIG. 9), the latter being connected to the rotation rod 15. The lever assemblies 13, 13', which are arranged on the extreme ends 18, 18' (FIG. 10) of the rotation rod 15, are rotationally driven to open or close the panel 1.

In FIG. 8 a sectional side view through the motor 5, the gearbox 12 and the frame 4 is shown. The section is taken through one of the fixings of the motor support 17 of the gearbox 12 to the frame 4, showing the vibration damper 14 and the fixing screw 32. The screw 32 does not touch the gearbox 12 and the vibration dampers 14 damp the vibrations arising from the operation of the motor 5 and thus do not reach the frame 4.

Figure 9:
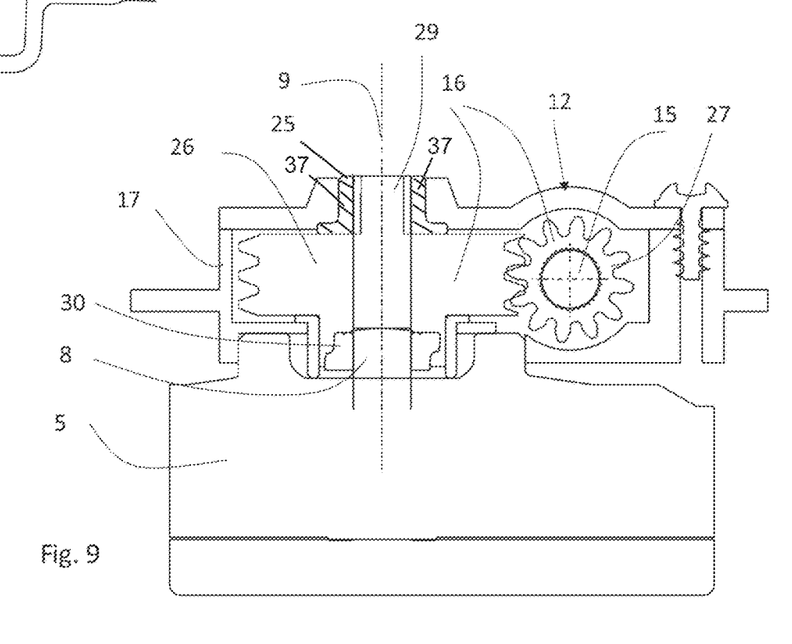
FIG. 9 is a schematic sectional side view according to line IX-IX in FIG. 5, showing worm wheel, gearwheel, gearbox, and motor.

In FIG. 9 a sectional view is shown in a similar section as is shown in FIG. 7, but only showing the motor 5 and gearbox 12. The motor 5 comprises the output shaft 8, which is equipped with a gearwheel 30. This gearwheel 30 fits into the hollow worm wheel 26 supported by the input shaft 29. The cavity in the worm wheel 26 has gear teeth that fit into opposite gear teeth of the gearwheel 30 of the output shaft 8 of the motor 5.

FIG. 10 shows a section through the rotation rod 15 showing the bearings 20, 20' comprising vibration damping material and the levers 13, 13' at the extreme ends 18, 18' of the rotation rod 15.

In FIG. 11 in a side view one of the lever assemblies 13, 13' is shown with the hinge points 21, 21' and the bearings 22, 22' comprising vibration damping material in the hinge points 21, 21'.

Figure 12A:
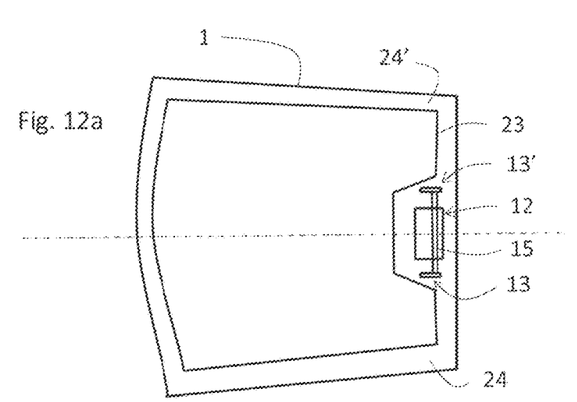
FIGS. 12a and 12b are schematic plan views of the outline of the panel, the outline of the headliner and a first and a second embodiment of the positions of the of lever assemblies.

In FIG. 12a an embodiment is shown in which the rotation rod 15 is limited in transverse length whereby the extreme ends 18, 18' of the rotation rod 15 are positioned near the short ends of the gearbox 12 to the left and right of the center line 7 of the vehicle. So, in this embodiment the panel 1 is supported on its rear side in a central area only.

Figure 12B:
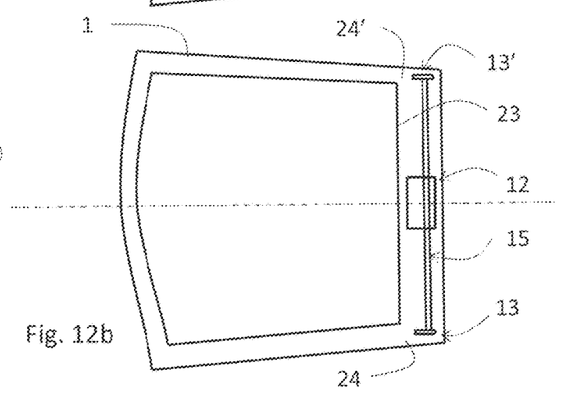

In FIG. 12b another embodiment is shown wherein the rotation rod 15 extends to the vicinity of the lateral sides 24, 24' of the panel 1. In this embodiment the lever assemblies 13, 13' are connected to the panel 1 at the lateral sides 24, 24' of the panel 1 and thus in this embodiment the rear corners of the panel 1 may be pulled down by the lever assemblies 13, 13'. While in the embodiment of FIG. 12a the panel 1 may be pulled down in the center area closer to the longitudinal centerline 7 of the vehicle.

The invention is not limited to the embodiments described before which may be varied widely within the scope of the invention as defined in the appended claims. For instance, it may be conceivable that the rotation rod 15 is equipped with additional lever assemblies 13, 13'. The rotation rod may extend in transverse direction up to the lateral sides 24, 24' of the panel 1 and comprises at both extreme ends 18, 18' a first and second lever assembly 13, 13' attached to the panel 1. In the area closer to the longitudinal center line of the vehicle a third and fourth lever assembly is attached to the panel 1. In such case the four lever assemblies may exert an even force to the panel 1 when the panel 1 is in its closed position to be able to have an even seal pressure along the rear edge of the panel 1. Each lever assembly 13, 13' may comprise more or less than the pair of levers shown in the drawings. It comprises at least a lever combined with one or more structural elements like levers, slides etc. The motor support may form a part of the additional gearbox or may be a separate part supporting the gearbox. The former embodiment of course has the advantage of a smaller vertical packaging and reduced number of parts. The operating mechanism may also include other structures instead of lever assemblies, such as for example vertically adjustable parts driven by a spindle formed on the rotation rod. The drive motor could also be arranged in a different position, such as at the front of the frame, or one motor on each lateral side of the frame.

What is claimed is:

1. An open roof construction for a vehicle having an opening in its fixed roof, comprising:
   at least one lever assembly;
   at least a panel coupled to the at least one lever assembly and configured to at least partly open and close the opening in the fixed roof with the at least one panel;
   a stationary frame configured to fit in the opening of the fixed roof;
   a drive motor placed in a vicinity of a rear edge of the opening in the fixed roof and in a vicinity of a longitudinal center line of the opening, said drive motor comprising an output shaft having a center axis which is perpendicular to a center axis of a rotor shaft of the drive motor;
   a gearbox coupled to the drive motor, the gearbox comprising a set of gear wheels to transfer torque from the output shaft of the motor through 90 degrees to a rotation rod of the gearbox, extending in a transverse direction of the open roof construction, and then to the at least one lever assembly; and a motor support attached to the drive motor and also attached to the frame with vibration dampers, and wherein the motor support supports the gearbox.

2. The open roof construction of claim 1, wherein the at least one lever assembly comprises two lever assemblies with a lever assembly attached to each end of the rotation rod.

3. The open roof construction of claim 1, wherein the drive motor is connected to the motor support with screws.

4. The open roof construction of claim 1, wherein the rotation rod is isolated from the motor support by at least one bearing equipped with vibration damping material.

5. The open roof construction of claim 1, wherein the at least one lever assembly is equipped at a hinge point with a bearing comprising vibration-damping material.

6. The open roof construction of claim 2, wherein the rotation rod extends in transverse direction of the open roof construction such that the lever assemblies mounted at extreme ends of the rotation rod are positioned near short sides of the motor and within boundaries of an inner side of a headliner when the at least one panel is in the closed position.

7. The open roof construction of claim 2, wherein the rotation rod extends in a transverse direction of the open roof construction such that the lever assemblies mounted at extreme ends of the rotation rod are positioned in the vicinity of lateral sides of the at least one panel.

8. The open roof construction of claim 1, and further comprising a bearing including vibration damping material mounted on an input shaft of the gearbox.

9. The open roof construction of claim 1, wherein the set of gearwheels comprises a worm wheel connected to an input shaft of the gearbox and a gear wheel attached to the rotation rod.

10. The open roof construction of claim 9, wherein the gear wheel is equipped with a bearing comprising vibration damping material.

11. The open roof construction of claim 1, wherein the motor support forms a bottom wall of the gearbox.

12. The open roof construction of claim 11, wherein the motor support at least partly accommodates a set of gearwheels of the gearbox.

13. An open roof construction for a vehicle having an opening in its fixed roof, comprising:
    an operating mechanism;
    at least a panel coupled to the operating mechanism and configured to at least partly open and close the opening in the fixed roof with the panel;
    a stationary frame configured to fit in the opening of the fixed roof and supporting the operating mechanism for the panel;
    a drive motor comprising an output shaft having a center axis which is perpendicular to a center axis of a rotor shaft of the drive motor and which is operatively connected to the operating mechanism, and wherein the drive motor is placed in a vicinity of a rear edge of the opening in the fixed roof and in a vicinity of a longitudinal center line of the opening;
    a gearbox coupled to the drive motor, the gearbox comprising a set of gear wheels to transfer torque from the output shaft of the motor through 90 degrees to a rotation rod of the gearbox, extending in a transverse direction of the open roof construction, and then to the operating mechanism; and
    a motor support attached to the drive motor and also attached to the frame with vibration dampers, and wherein the motor support supports the gearbox.

14. The open roof construction of claim 13, wherein the operating mechanism comprises a lever assembly attached to opposite ends of the rotation rod.

15. A vehicle comprising:
    a fixed roof with an opening; and
    an open roof construction, said open roof construction comprising:
        at least one lever assembly;
        at least a panel coupled to the at least one lever assembly and configured to at least partly open and close the opening in the fixed roof with the at least panel;
        a stationary frame fitted in the opening of the fixed roof;
        a drive motor placed in a vicinity of the rear edge of the opening in the fixed roof and in a vicinity of a longitudinal center line of the opening, said drive motor comprising an output shaft having a center axis which is perpendicular to a center axis of a rotor shaft of the drive motor;
        a gearbox coupled to the drive motor, the gearbox comprising a set of gear wheels to transfer torque from the output shaft of the motor through 90 degrees to a rotation rod of the gearbox, extending in a transverse direction of the open roof construction, and then to the at least one lever assembly; and
        a motor support attached to the drive motor and also attached to the frame with vibration dampers, and wherein the motor support supports the gearbox.

16. The open roof construction of claim 13, wherein the rotation rod extends in transverse direction of the open roof construction such that the lever assemblies mounted at extreme ends of the rotation rod are positioned near short sides of the motor and within boundaries of an inner side of a headliner when the at least one panel is in the closed position.

17. The open roof construction of claim 13, wherein the rotation rod extends in a transverse direction of the open roof construction such that the lever assemblies mounted at extreme ends of the rotation rod are positioned in the vicinity of lateral sides of the at least one panel.

18. The open roof construction of claim 13, wherein the set of gearwheels comprises a worm wheel connected to an input shaft of the gearbox and a gear wheel attached to the rotation rod.

19. The open roof construction of claim 18, wherein the motor support forms a bottom wall of the gearbox.

20. The open roof construction of claim 19, wherein the motor support at least partly accommodates a set of gearwheels of the gearbox.

* * * * *